April 21, 1964 A. HARTIG 3,129,629
TIGHTENING DEVICE FOR DETACHABLY CONNECTED MACHINE ELEMENTS
Filed Oct. 3, 1958 2 Sheets-Sheet 1
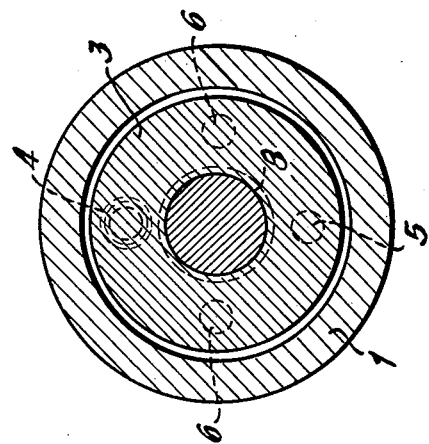
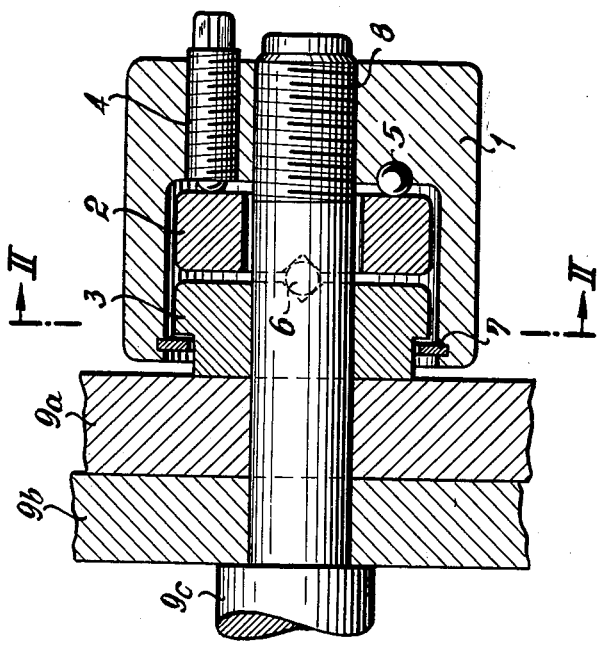
INVENTOR
ALFRED HARTIG
BY April 21, 1964     A. HARTIG     3,129,629
TIGHTENING DEVICE FOR DETACHABLY CONNECTED MACHINE ELEMENTS
Filed Oct. 3, 1958     2 Sheets-Sheet 2
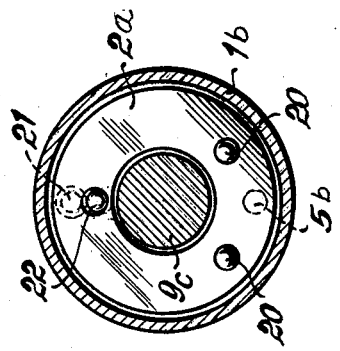
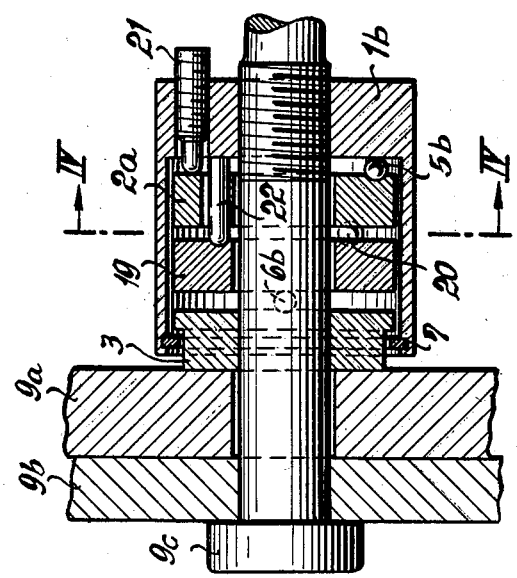
INVENTOR
ALFRED HARTIG
BY

United States Patent Office 3,129,629
Patented Apr. 21, 1964

3,129,629
TIGHTENING DEVICE FOR DETACHABLY CONNECTED MACHINE ELEMENTS
Alfred Hartig, Kotzenhof, Lauf (Pegnitz), Germany, assignor to Rudolf Spieth, Esslingen (Neckar)-Kennenburg, Germany
Filed Oct. 3, 1958, Ser. No. 765,191
3 Claims. (Cl. 85—32)

The present invention relates to a connecting device for detachably connecting and tightening machine elements together.

For purposes of interconnecting or tightening together machine elements, tools, work-pieces or the like, it is customary practice to employ threaded bolts with nuts. However, with such arrangements, when tightening the nut or the bolt, friction losses occur in the windings of the thread and between the contacting surfaces of the rotatable connecting element and the stationary element to be connected. These friction losses increase with increasing axial pressure, and, therefore, unfavorably influence the torques to be employed for the connecting operation. When high contact pressure is required for connecting or tightening the elements together, a relatively high torque is required which, due to the friction losses between the threads on one hand and between the tightening nut and the element to be connected on the other hand are additionally increased to a considerable extent.

With the heretofore known tightening methods by bolt and screw, the said torques are produced, for instance, by the fact that the arm of the wrench is considerably increased and the tangential force to be employed is produced by hammer-blows upon the outer end of the extended arm of the wrench. Such an operation requires considerable forces bodily to be produced by the operator and frequently causes bodily damage due to over-strain, such as damage to the lungs, and the like. In addition thereto, there exists the risk that with such an operation, the wrench slides off and that as a result thereof the hammer misses its goal and causes accidents. Furthermore, in instances in which a previously precisely adjusted position of the element to be connected must be maintained, a displacement of the element to be connected can practically not be avoided in view of the step-wise rather jerky tightening of the tightening element.

It is, therefore, an object of the present invention to provide a tightening or connecting arrangement which will overcome the above-mentioned drawbacks.

It is another object of this invention to provide a tightening or connecting device by means of which high contact pressure can be exerted at low torques while reducing the friction losses to a minimum.

These and other objects and advantages of the invention will appear more clearly from the following specification in connection with the accompanying drawings, in which:

FIGURE 1 is a longitudinal section through a connecting device according to the invention provided with a cup-shaped main body and a tiltable disc;

FIGURE 2 is a section taken along the line II—II of FIGURE 1;

FIGURE 3 is a longitudinal section through a modified connecting device according to the invention; and FIGURE 4 is a section taken on line IV—IV of FIGURE 3.

General Arrangement

The connecting device according to the present invention is characterized primarily in that tilting levers in the form of discs are fulcrumed on a main body of the connecting or tightening device. These discs are arranged in spaced axial relationship one behind the other in such a way that the pressure exerted upon the disc initiating the tightening operation is correspondingly increased and conveyed to the pressing element through the intervention of correspondingly arranged bearings in cooperation with the lever transmission ratio produced by the discs. The pressing element will then, without rotative movement, be pressed in axial direction against the element to be connected.

Structural Arrangement

Referring now to the drawings in detail, and FIGS. 1 and 2 thereof in particular, the connecting device illustrated therein comprises a main body 1 in form of a cup-shaped sleeve, the bottom of which is provided with a concentrically arranged threaded bore 8. This sleeve is mounted on one of the elements 9a of the elements 9a, 9b and 9c to be connected and forms an end member of the connecting device. In the bottom of the sleeve 1 there is arranged a pressure screw 4 which is eccentrically located with regard to the threaded bore 8. The dome or crest of the screw 4 extends into the hollow chamber confined by the sleeve and engages a tiltable disc 2. The arrangement furthermore comprises a ball 5 or the like interposed between the bottom of the sleeve 1 and the disc 2 and is arranged diametrically opposite to the pressure screw 4. The counter-bearing for the disc 2 consists of two balls 6 which are arranged along a straight line passing through the central axis of the sleeve 1. The connecting line between the two balls 6 forms an angle of 90° with the connecting line between the screw 4 and ball 5. The two balls 6 forming the counter-bearing for the tiltable disc 2 simultaneously form the bearing for a pressure member 3 which, on the other hand, rests against the element 9a. In order to secure the bearings of the tightening elements 2, 3, 5 and 6 in the sleeve 1 and to prevent the same from dropping out, the pressure element 3 is provided, for instance, with a flange which, if desired, may abut a spring ring 7 or the like inserted in a groove 25 in sleeve 1. The pressure transmission ratio is dependent on the arrangement of the bearings and the length of the lever arm of the tilting disc. In the embodiment shown in FIGS. 1 and 2, the transmission ratio is 1:2 inasmuch as the counter-bearing 6 is arranged in the central plane between the two bearings 4 and 5.

The operation of the connecting device shown in FIGS. 1 and 2 is as follows: In order to connect the elements 9a, 9b and 9c to each other, the tightening device is, instead of a customary tightening nut, screwed upon one of the elements to be connected, for instance, upon a shaft 9c, until the pressure element 3 rests against the other element to be connected. Instead of further turning the nut to tighten the connection requiring relatively great force and producing high friction losses, according to the present invention the screw 4 eccentrically located in the sleeve 1 is actuated so that the disc 2 tilts about the bearing 5. As a result thereof, the counter-bearing 6 is axially displaced by half the stroke of the pressure screw 4 whereby the pressing element 3, without rotation, is pressed by the same distance and with twice the force against the elements 9a, 9b and 9c to be connected. As will be evident, in this way, no sliding friction resistance is encountered between the pressing element and the parts to be connected. Furthermore, the thread friction of the pressure screw 4 with regard to the contact pressure is less than the heretofore known threaded nuts in conformity with the ratio of the power transmission.

The straight connecting lines between bearings 4 and 5 on one hand and the counter-bearings 6 on the other hand form, as mentioned above, an angle of 90° with regard to each other and thus cross on the axis of one of the elements 9c which coincides with the center line of the entire connecting device if the pressing element 3 is concentrically guided. During the connecting operation, for instance, shaft 9c or a corresponding element is precisely centrally loaded. Even if the elements to be connected are not parallel to each other, automatically a plane surface adjustment with regard to the main body will occur. In this way, the unilateral load which in such instance occurs with the heretofore known threaded tightening nuts and the bending of the elements to be connected caused thereby, is automatically avoided.

Referring now to the the embodiment of FIGS. 3 and 4, the connecting device shown therein comprises a plurality of tiltable discs 2a, 19 arranged in series in order to obtain a higher power transmission ratio. The main body is represented by a cup-shaped sleeve 1b. As will be evident from FIG. 3, the disc 2a constitutes a lever with one arm extending from fulcrum 5b to counter-bearing 20 and the other arm from fulcrum 5b to force applying pin 21, these two arms having a ratio, for instance, of 1:7. The counter-bearing 20 simultaneously acts as pressure conveying bearing for the second tiltable disc 19. The distance between this bearing 20 and the counter-bearing 66 equals half the distance between the bearing 20 and the bearing 22, which latter rests directly against the main body 1b. This yields a lever transmission ratio of 1:2 for the second tiltable disc. Consequently, the total transmission ratio will be $$i = \frac{1}{7} \times \frac{1}{2} = \frac{1}{14}$$

It is a matter of course that by correspondingly selecting the number of the effective tiltable discs and the corresponding bearings therefor, the transmission ratio may be varied and increased at random.

With the embodiment of FIGS. 3 and 4, the pressure pin 21 is a screw but a pin may be employed, the axial stroke of which may be effected for instance, by a spring packet, an eccentric lever, or the like.

It is, of course, to be understood that the present invention is, by no means, limited to the particular constructions shown in the drawings, but also comprises any modifications within the scope of the appended claims.

What I claim is:

1. An arrangement for detachably interconnecting and tightening machine elements, one of which has a threaded shank, which includes: a main cup-shaped body having a threaded portion threadedly engaging said threaded shank, said main body also being provided with a threaded bore located eccentrically with regard to said threaded portion, tiltable disc means arranged around said shank and interposed between said main body and another one of said machine elements, a pressure screw extending through said eccentrically located threaded bore of said main body and operable to engage said disc means adjacent the periphery thereof and to exert pressure thereon, first means interposed between said main body and said disc means at a point diametrically opposite the point where said pressure screw is adapted to engage said disc means to allow said disc means to tilt about said first bearing means in response to the exertion of a certain pressure upon said disc means by said pressure screw, a pressure conveying member interposed between said other machine element and said disc means for conveying pressure to said other machine element, and two additional bearing means arranged diametrically opposite each other and interposed between said pressure conveying member and said disc means for conveying the pressure exerted upon said disc means in response to a tilting movement of the latter to said pressure conveying member and thence to said other machine element, the connecting line between said two additional bearing means being arranged at a right angle with regard to the connecting line between said first bearing means and the point of engagement of said pressure screw with said disc means, said last mentioned connecting line intersecting the projection of said first mentioned connecting line upon said last mentioned connecting line in axial direction of said main body and intersecting said projection at the midway point thereof.

2. An arrangement according to claim 1, in which said cup-shaped main body is provided with a groove arranged at that end thereof which is remote from said threaded bore, and means in said groove for retaining said pressure conveying member, and said disc means, and said first bearing means and said two additional bearing means together as a unit.

3. An arrangement according to claim 1, in which said disc means comprises two discs surrounding said shank and interposed between said main body and said pressure conveying member, said arrangement also comprising third bearing means supported by said main body and extending through the adjacent one of said two discs with play and engaging the other one of said two discs at an area eccentrically located with regard to said shank, said third bearing means being on the same side of said shank as said pressure screw and in substantial radial alignment with the screw, and fourth bearing means interposed between said two discs on the side of the said shank opposite said third bearing means and forming an axis for pivotal movement of the discs on each other which extends in a direction substantially parallel to the connecting line between said two additional bearing means.

References Cited in the file of this patent

UNITED STATES PATENTS

| 445,558 | Jantz | Feb. 3, 1891 |
|---|---|---|
| 814,228 | McGahan et al. | Mar. 6, 1906 |
| 836,303 | Christensen | Nov. 20, 1906 |
| 2,227,397 | Lucker | Dec. 31, 1940 |
| 2,246,750 | Murphy | June 24, 1941 |
| 2,430,677 | Hobart | Nov. 11, 1947 |
| 2,670,058 | Landrum | Feb. 23, 1954 |
| 2,707,108 | Schottler | Apr. 26, 1955 |
| 2,806,723 | Fairclough | Sept. 17, 1957 |
| 2,812,684 | Schrem | Nov. 12, 1957 |

FOREIGN PATENTS

| 614,635 | Great Britain | Dec. 20, 1948 |